US011656461B2

(12) United States Patent
Hasegawa et al.

(10) Patent No.: US 11,656,461 B2
(45) Date of Patent: May 23, 2023

(54) HEAD-MOUNTED DISPLAY DEVICE WITH ADJUSTER

(71) Applicant: Ricoh Company, Ltd., Tokyo (JP)

(72) Inventors: Aino Hasegawa, Kanagawa (JP); Shigenobu Hirano, Kanagawa (JP); Yasuo Katano, Kanagawa (JP); Kenji Kameyama, Kanagawa (JP); Norikazu Igarashi, Kanagawa (JP); Naoki Nakamura, Saitama (JP); Yoshifumi Sudoh, Kanagawa (JP); Masahiro Itoh, Kanagawa (JP); Shun Okazaki, Kanagawa (JP); Susumu Momma, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 16/950,365

(22) Filed: Nov. 17, 2020

(65) Prior Publication Data

US 2021/0165221 A1    Jun. 3, 2021

(30) Foreign Application Priority Data

Nov. 29, 2019 (JP) .............................. JP2019-217586

(51) Int. Cl.
  *G02B 27/01* (2006.01)
  *G02B 27/64* (2006.01)
  *G02B 6/42* (2006.01)

(52) U.S. Cl.
  CPC ....... *G02B 27/0172* (2013.01); *G02B 6/4204* (2013.01); *G02B 27/0176* (2013.01); *G02B 27/642* (2013.01); *G02B 2027/0178* (2013.01)

(58) Field of Classification Search
  CPC .................................................. G02B 27/0172
  See application file for complete search history.

(56) References Cited

U.S. PATENT DOCUMENTS

| 5,880,883 A * | 3/1999 | Sudo .................... H04N 13/189 |
| | | 359/462 |
| 2005/0018279 A1* | 1/2005 | Johnson ................. G02B 13/16 |
| | | 359/363 |
| 2010/0283959 A1* | 11/2010 | Miyashita .............. G02C 3/003 |
| | | 351/123 |
| 2011/0157707 A1* | 6/2011 | Tilleman ................ G03B 21/14 |
| | | 359/630 |

(Continued)

FOREIGN PATENT DOCUMENTS

| JP | 6-123852 | 5/1994 |
| JP | 2008-61052 | 3/2008 |

(Continued)

*Primary Examiner* — William Boddie
*Assistant Examiner* — Andrew B Schnirel
(74) *Attorney, Agent, or Firm* — Xsensus LLP

(57) ABSTRACT

A head-mounted display device includes a display element to display an image; a light guide member to emit the image displayed on the display element to an eye of a wearer; a housing including an optical system to guide image light of the image displayed on the display element to the light guide member; and an adjustment member provided on a side of the light guide member opposite to the optical system, and to bend the housing on a side opposite to a face of the wearer.

20 Claims, 13 Drawing Sheets

(56) References Cited

U.S. PATENT DOCUMENTS

| | | | |
|---|---|---|---|
| 2011/0234476 A1* | 9/2011 | Sugihara | G02B 27/0176 345/8 |
| 2013/0038510 A1* | 2/2013 | Brin | G02B 27/017 345/8 |
| 2013/0120224 A1* | 5/2013 | Cajigas | G09G 5/00 345/8 |
| 2015/0219902 A1* | 8/2015 | Kim | G02B 27/0179 345/8 |
| 2016/0116735 A1 | 4/2016 | Hayashi et al. | |
| 2016/0266384 A1 | 9/2016 | Nakamura et al. | |
| 2016/0282627 A1* | 9/2016 | Hiraide | G02B 27/0176 |
| 2018/0031847 A1* | 2/2018 | Tatsuta | G02B 27/0179 |
| 2020/0233213 A1* | 7/2020 | Porter | G02B 27/0176 |

FOREIGN PATENT DOCUMENTS

| | | |
|---|---|---|
| JP | 2013-200553 | 10/2013 |
| JP | 2015-219405 | 12/2015 |
| WO | 2015/137165 | 9/2015 |

* cited by examiner

SHAPE OF DISPLAY ELEMENT
(0.38 INCHES)
(LATERAL PIXELS: VERTICAL PIXELS = 16:9)

BOARD WITH DISPLAY
ELEMENT MOUNTED

HEAD-MOUNTED DISPLAY DEVICE WITH ADJUSTER

CROSS-REFERENCE TO RELATED APPLICATIONS

This patent application is based on and claims priority pursuant to 35 USC § 119(a) to Japanese Patent Application No. 2019-217586, filed on Nov. 29, 2019, in the Japan Patent Office, the entire disclosure of which is hereby incorporated by reference herein.

BACKGROUND

Technical Field

The present disclosure relates to a head-mounted display device.

Description of the Related Art

In recent years, many eyeglass-shaped head-mounted display devices have been developed. Such a device is called a head-mounted display (HMD), virtual reality (VR) goggles, VR glasses, smart glasses, augmented reality (AR) glasses, an eyeglass-shaped display, or an eyeglass-shaped device depending on the shape of the device. Displaying a virtual image on a display in front of the eye or superimposing a virtual image on a real background can provide an experience that is completely different from those of an existing desktop display, smart phone, and tablet terminal.

The viewer of a device, such as the HMD or smart glasses, needs to wear the device so that the image signal enters the pupil of the viewer. However, the size of the skeletal structure of the head or face of a human varies depending on the age, sex, and race, and hence, not all people are covered by one size. In the case of normal eyeglasses, the temples of the eyeglasses can be expanded to meet the skeletal structure of the face or head or fitting is performed. In the case of the HMD or smart glasses, however, it is not allowed to extend, expand, or deform the optical path through which the image signal propagates. It is required to prepare devices with a plurality of sizes for a viewer having a small skeletal structure and a viewer having a large skeletal structure or to prepare a device with a sufficiently large size.

When a large-sized HMD or smart glasses is formed and secured by tightening, the wearer feels pain at the tightened portion through tightening while the wearer wears the HMD or smart glasses, and it is difficult to wear the HMD or smart glasses for a long time. When a person whose head is large wears the normal size, the temples of the HMD or smart glasses are forcedly expanded, hence the incident angle of the image on a light guide plate or a mirror is changed, and the image is no longer viewable.

SUMMARY

A head-mounted display device according to an embodiment of the disclosure includes a display element to display an image; a light guide member to emit the image displayed on the display element to an eye of a wearer; a housing including an optical system to guide image light of the image displayed on the display element to the light guide member; and an adjustment member provided on a side of the light guide member opposite to the optical system, and to bend the housing on a side opposite to a face of the wearer.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
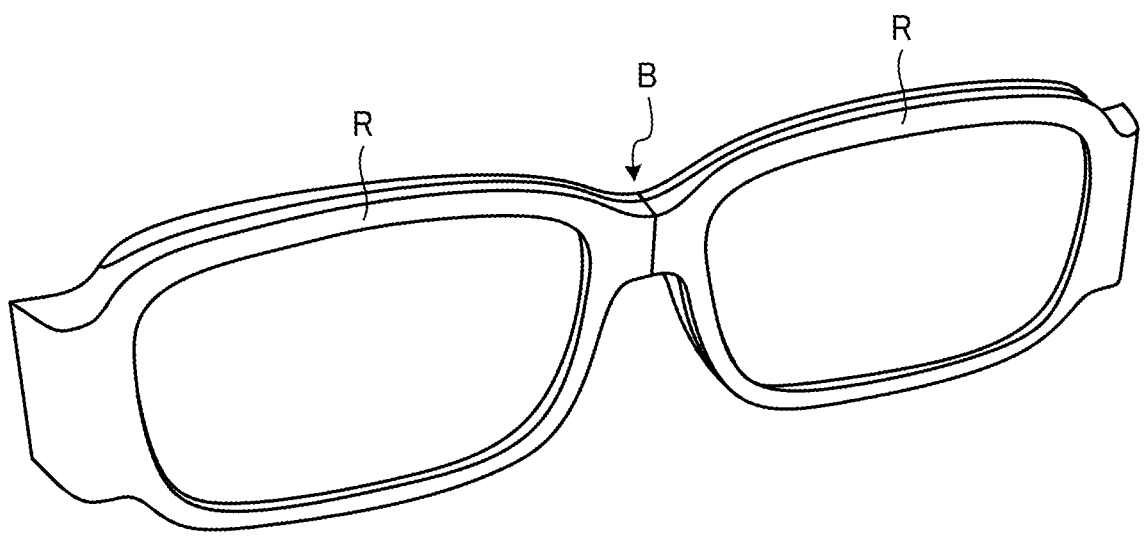
FIG. 1 is a perspective view of a main part of an eyeglass-shaped display device according to an embodiment in which an adjustment member is provided in a bridge.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An eyeglass-shaped display device that is an embodiment of a head-mounted display device is described below.

Overview

Although described later, in the case of the eyeglass-shaped display device according to the embodiment, there is, for example, a display device as an HMD device of a type that projects image light output from an image display element and reflects the projected image light to be viewed using a semi-transmissive element, such as a mirror or a half mirror, located in front of the eye. In this type, the image display element and the semi-transmissive element, such as a mirror or a half mirror, can be spaced apart from each other. Thus, the image display element can be disposed on the rear side with respect to the eyeball surface, the weight of a portion on the front side with respect to the eyeball surface can be reduced, and the burden on the nose can be reduced.

The wearer of the eyeglass-shaped display device according to the embodiment visually recognizes the image light output from the display element via a light guide member. This type is also used for, for example, a head-mounted display that provides binocular transmissive AR displaying. The eyeglass-shaped display device of such an embodiment guides the image light output from the image display element to a light guide plate via a collimator lens or a mirror, and causes the image light to be incident on the eye through the light guide member. As described above, passing the image light through the light guide member can provide image displaying with a viewing angle of 20 degrees or more, and it is possible to display a large image having a viewing angle of about 60 degrees depending on the structure of the light guide member.

In this case, the image formed in a display housing located near the temporal region of the wearer is emitted on the eye of the user via a housing frame corresponding to a temple and a light guide member provided in the rim. Thus, when the housing frame corresponding to the temple is bent to allow the width between the temples to meet the width of the face of the wearer, the optical path of the image light in the housing frame is bent. Thus, the quality of displaying may be degraded. For example, a distortion may be generated in the image to be visually recognized, or it may be difficult to visually recognize the image. The housing frame or the like may be formed of a member that is not bent. In this case, a user whose face has a large width has difficulty in wearing the eyeglass-shaped display device according to the embodiment.

In a case where the bridge coupling the rims is expandable to meet the width of the face of the wearer, even a wearer whose face has a large width can wear the eyeglass-shaped display device. In this case, however, as the bridge is extended, the distance between the eyes (interpupillary distance) of the eyeglass-shaped display device is extended. Thus, an inconvenience occurs in which a portion or the entirety of the image light passing through the light guide member of the rim is emitted at a position deviated from the eye of the wearer, and it is difficult to recognize a portion or the entirety of an image.

There may be prepared a plurality of kinds of eyeglass-shaped display devices each having an optical system in which the length of the optical path from a display element to an eyeball is designed in accordance with the width of the face of each wearer. However, preparing such display devices increases the production cost and hence is not practical.

Thus, as illustrated in FIG. 1, an adjustment member is provided in the eyeglass-shaped display device according to the embodiment. The adjustment member is disposed in a bridge B that couples rims R, and changes the angle of the bridge B. The adjustment member is bent in a V shape to protrude in a direction opposite to the face of the wearer to enable wearing in accordance with the width of the face of the wearer without changing the length of the optical path (optical axis) with the distance between the eyes (interpupillary distance) maintained.

Figure 2:
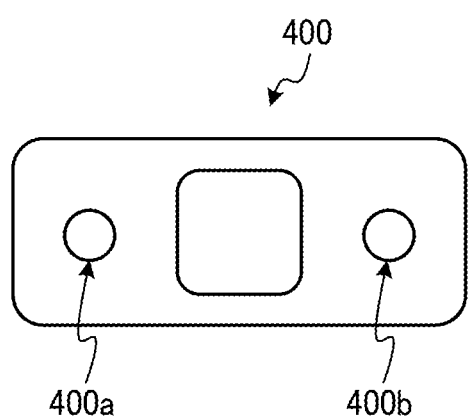
FIG. 2 is a plan view of a leaf spring as an example of the adjustment member.
Figure 3:
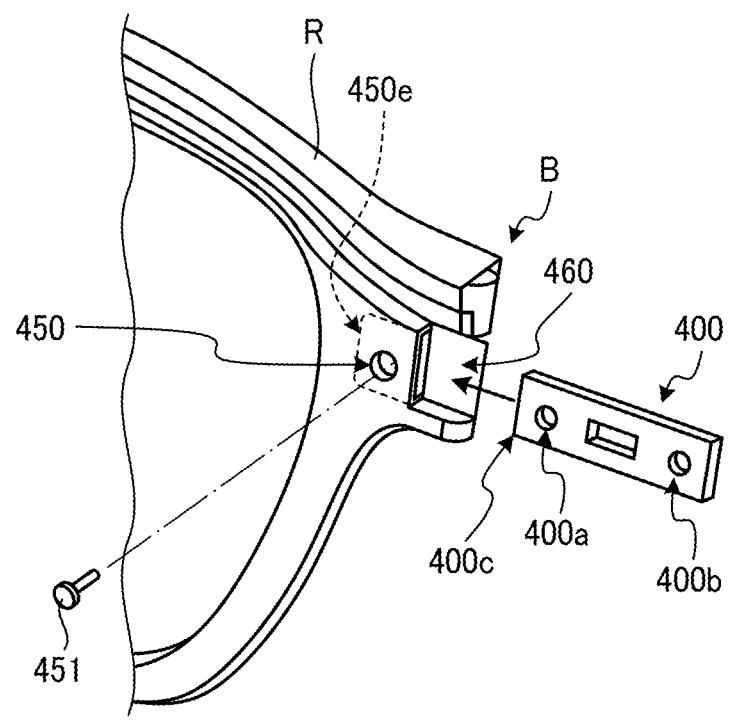
FIG. 3 illustrates attachment of the adjustment member to the bridge.

Examples of Configuration and Attachment of Adjustment Member FIG. 2 is a plan view of an adjustment member 400. FIG. 3 is a perspective view illustrating a state where the adjustment member 400 is attached to a portion of the bridge B of the eyeglass-shaped display device. As illustrated in FIGS. 2 and 3, the adjustment member 400 has a rectangular shape. The adjustment member 400 is formed of a member that can be curved (bent), for example, a leaf spring or a hard rubber member. The adjustment member 400 has a bending stress smaller than the bending stress of the housing frame (reference sign 2 in FIGS. 6A and 6B) corresponding to the temple. The adjustment member 400 has screw holes 400a and 400b near the short sides of the adjustment member 400.

Figure 4:
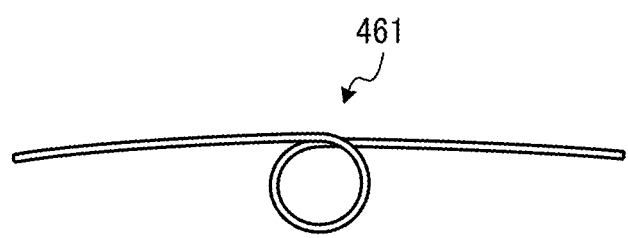
FIG. 4 is a plan view of a torsion spring as another example of the adjustment member.

As the adjustment member 400, a torsion spring 461 illustrated in FIG. 4 may be used.

The eyeglass-shaped display device is divided into two housings including one housing and another housing with the approximate center of the bridge B serving as the boundary. FIG. 3 is a perspective view of one housing. As illustrated in FIG. 3, an attachment groove portion 460 for attachment of the adjustment member 400 is provided at a portion of the eyeglass-shaped display device corresponding to the bridge B. The attachment groove portion 460 is provided in a direction in which the bridge B is formed. As indicated by the arrow in FIG. 3, the attachment groove portion 460 is formed to cover substantially half of the adjustment member 400 and expose the remaining half of the adjustment member 400 when the adjustment member 400 is attached thereto. The portion of the attachment groove portion 460 that covers substantially half of the adjustment member 400 has a screw hole 450. A portion of the bridge B of the other housing has the same configuration as described above.

In such an eyeglass-shaped display device, when the adjustment member 400 is attached to the bridge B, as indicated by the arrow in FIG. 3, the adjustment member 400 is inserted into the attachment groove portion 460 with a short side of the adjustment member 400 serving as a leading end. Thus, an end portion 400c of the short side of the adjustment member 400 comes into contact with an end portion 450e of the attachment groove portion 460. In this state, a screw hole extending from the screw hole 450 provided in the attachment groove portion 460 to the screw hole 400*a* of the adjustment member 400 is formed.

A screw 451 is inserted through the screw hole 450 provided in the attachment groove portion 460 to screw the adjustment member 400 to the portion of the bridge B of the eyeglass-shaped display device via the screw hole 450 of the attachment groove portion 460 and the screw hole 400*a* of the adjusting member 400. The screwed adjustment member 400 is screwed to the other one of the housings likewise as described above.

Although the adjustment member 400 is screwed in this example, the adjustment member 400 may be secured by another securing member such as an adhesive.

Function of Adjustment Member

Figure 5A:
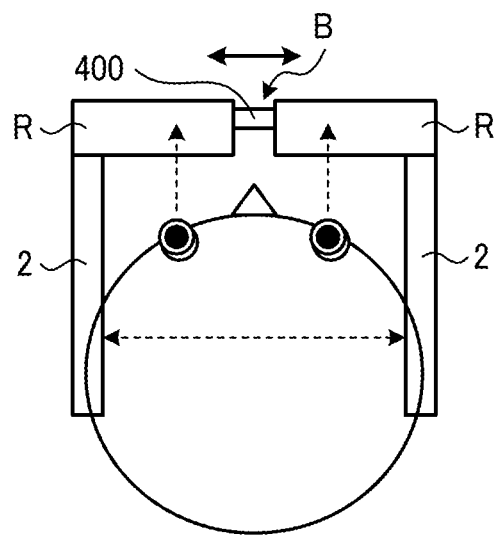
FIGS. 5A and 5B illustrate an eyeglass-shaped display device in which a bridge is extended to adjust the distance between temples to meet the width of the face of a wearer.
Figure 5B:
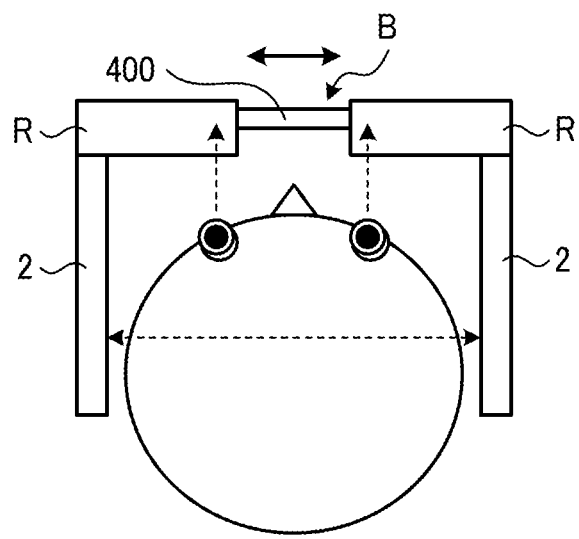

When the distance between the temples of the eyeglass-shaped display device is equal to or less than the width of the face of the wearer as illustrated in FIG. 5A, the bridge is extended as illustrated in FIG. 5B to make the distance between the temples meet the width of the face of the wearer. Thus, the wearer can wear the eyeglass-shaped display device. However, in this case, since the distance between the eyes (interpupillary distance) is changed as described above, it is difficult to visually recognize a portion or the entirety of an image. Since the length of the optical path also changes, the adjustment mechanism corresponds to the adjustment mechanism in which the length of the optical path changes like the comparative example in FIG. 8 of the present application. Hence the image is no longer displayed when the length of the optical path changes.

Figure 6A:
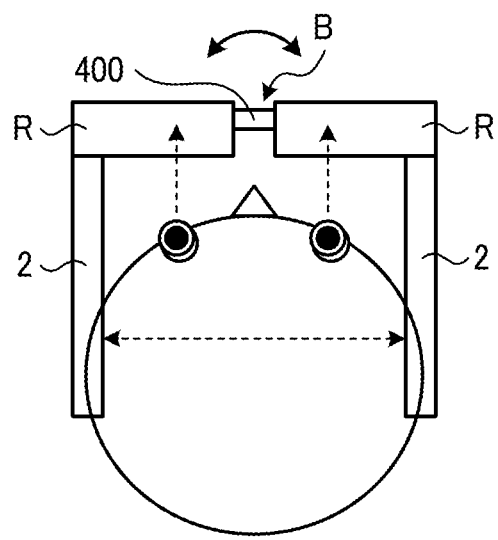
FIGS. 6A and 6B illustrate an eyeglass-shaped display device according to an embodiment in which a bridge is bent to adjust the distance between temples to meet the width of the face of a wearer.
Figure 6B:
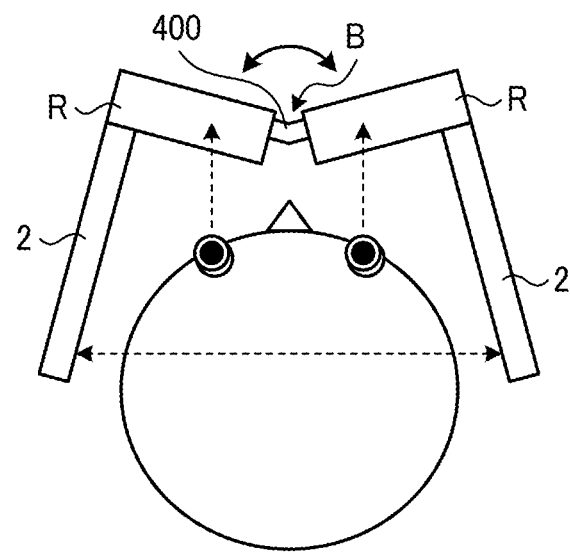

In contrast, in the eyeglass-shaped display device according to the embodiment, when the distance between the temples is equal to or less than the width of the face of the wearer as illustrated in FIG. 6A, the adjustment member 400 provided in the bridge B bends in a V shape to protrude in the direction opposite to the face of the wearer as illustrated in FIG. 6B to increase the distance between the temples (the distance between the housing frames 2), thereby enabling wearing. In other words, the bridge B of the adjustment member 400 is divided and the angle in the direction (horizontal direction) of the line of sight when the wearer looks at the front is changed to increase the distance between the temples (the distance between the housing frames 2), thereby enabling wearing.

When the bridge is extended as illustrated in FIGS. 5A and 5B, the distance between the lens centers (interpupillary distance) changes. In contrast, in the eyeglass-shaped display device according to the embodiment as illustrated in FIGS. 6A and 6B, merely the angle of each rim R slightly changes, and the distance between the eyes (interpupillary distance) is almost not changed. Thus, an inconvenience that it is difficult to visually recognize a portion or the entirety of an image because of a change in the distance between the eyes (interpupillary distance) can be avoided.

The eyeglass-shaped display device according to the embodiment does not affect the optical system in the housing frame 2 because the bridge B bends. The distance between the temples can be adjusted to the width of the face of the wearer without changing the optical path. Thus, a good displaying form can be maintained.

For example, in the case of an eyeglass-shaped display device disclosed in JP-3298977-B, a weight balance device and a head-width adjustment mechanism are provided. In the case of the eyeglass-shaped display device, the optical system is mainly arranged in the front portion, the weight balance is adjusted using a "weight", and the width of the head is adjusted using a band. Thus, unnecessary weights of the weight and the adjustment mechanism are applied, and the shape of the device is markedly different from that of the eyeglasses.

In contrast, since the eyeglass-shaped display device according to the embodiment includes the adjustment member 400 in the bridge B, the eyeglass-shaped display device can be small, lightweight, and simple, and can maintain the shape of the body of the eyeglasses.

Experimental Result of Wearing in Comparative Example

The applicant of the present disclosure prototyped an eyeglass-shaped display device without the adjustment member 400 in the bridge B. In the eyeglass-shaped display device without the adjustment member 400, the distance between the temples (=the distance between the display housings 1) was 160 mm, and adult males having heads with widths of 151 mm, 155 mm, 158 mm, 160 mm, 165 mm, and 170 mm each wore the eyeglass-shaped display device. Through this experiment, the wearers up to the wearer having the head with the width of 160 mm could wear the eyeglass-shaped display device without the adjustment member 400 and could visually recognize an image.

The wearer having the head with the width of 165 mm could wear the eyeglass-shaped display device with a feeling of tightness; however, the optical axis had a deviation, and the wearer had difficulty in visually recognizing an image. The wearer having the head with the width of 170 mm even had difficulty in wearing the eyeglass-shaped display device.

Experimental Result of Wearing of Eyeglass-Shaped Display Device in Embodiment

An eyeglass-shaped display device with the adjustment member 400 provided in the portion of the bridge B as described above was prototyped. Like the comparative example, the distance between the temples (=the distance between the display housings 1) was 160 mm, and adult males having heads with widths of 151 mm, 155 mm, 158 mm, 160 mm, 165 mm, and 170 mm each wore the eyeglass-shaped display device. Through this experiment, it was confirmed that all wearers could wear the eyeglass-shaped display device, and also could visually recognize images well.

First Advantageous Effect of Embodiment

As apparent from the above description, the eyeglass-shaped display device according to the embodiment includes the adjustment member 400 formed of an elastic member in the bridge B, and the adjustment member 400 is bent in a V shape to protrude in the direction opposite to the face of the wearer to extend the distance between the temples (the distance between the housing frames 2). Thus, even the wearer having the face with the width larger than the distance between the temples can wear the eyeglass-shaped display device according to the embodiment.

Since the adjustment member 400 bends in the direction opposite to the face of the wearer to increase the width between the temples, merely the angle of each rim R is slightly changed, and the distance between the eyes (interpupillary distance) is almost not changed. Thus, an inconvenience that it is difficult to visually recognize a portion or the entirety of an image because of a change in the distance between the eyes (interpupillary distance) can be avoided.

The eyeglass-shaped display device may be either a type of projecting images on both eyes or a type of projecting an image on an eye. In the case of a type of eyeglass-shaped display device that projects an image on an eye, the display element that forms an image and the optical system that is provided in the housing frame may be provided in one of the housing frames. Alternatively, in the case of a type of eyeglass-shaped display device that projects an image on an eye, components such as the optical system may be distributed in respective housing frames. For example, a display element to form an image may be provided in one housing frame, and an optical system may be provided in the other housing frame. Thus, it possible to adjust the balance of the weights of the housing frames.

Reduction in Size and Weight of Eyeglass-Shaped Display Device

The eyeglass-shaped display device according to the present embodiment guides image light of an image displayed on the display element as described above to the light guide member through the optical system and causes the image light to be incident on the eyes of the wearer via the light guide member to cause the wearer to visually recognize the image light. The display element has a rectangular shape, and is normally arranged to be laterally long like a television receiver or the like. However, in the case of the eyeglass-shaped display device according to the embodiment, the display element is arranged to be vertically long. When the display element is arranged to be laterally long, the width of the housing that houses the display element (the length from the temporal region of the wearer to the outward direction (vertical direction)) increases, and the housing increases in size and weight. In contrast, when the display element is arranged to be vertically long, the width of the housing can be reduced, and the entire eyeglass-shaped display device can be reduced in size and weight as the result of the reduction in size and weight of the housing.

However, when the display element is arranged to be vertically long, the displayed object is visually recognized while the display object is displayed in the vertical direction. Thus, the image light from the display element is rotated by an image rotation optical element to form image light of a laterally long image, and the image light is temporarily focused at an intermediate position (between the display element and the light guide member). Then, the image light of the laterally long image is visually recognized with the eye of the wearer via the light guide member. Thus, the eyeglass-shaped display device can be entirely reduced in size and weight, and a normal display form can be obtained.

External Appearance Configuration

Figure 7:
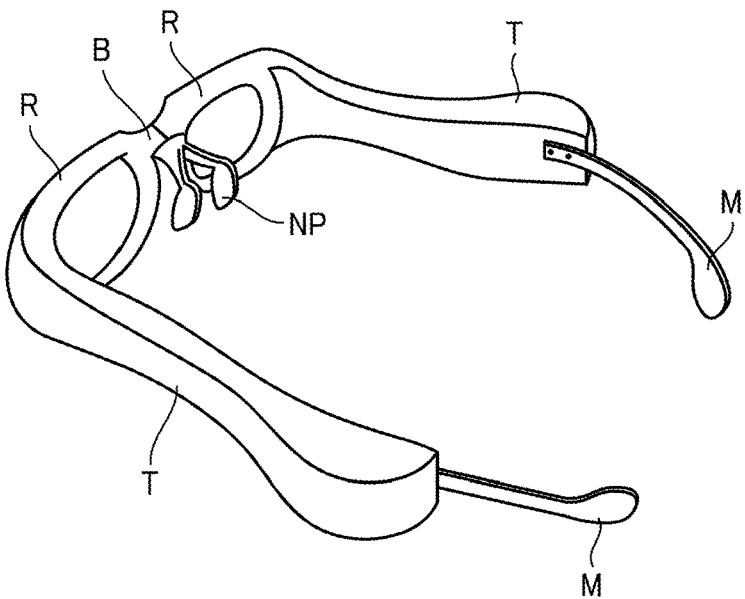
FIG. 7 is a perspective view illustrating an external appearance of an eyeglass-shaped display device according to an embodiment.

FIG. 7 is a perspective view illustrating an external appearance of an eyeglass-shaped display device according to an embodiment. As illustrated in FIG. 7, the eyeglass-shaped display device according to the embodiment includes rims R for the left and right eyes, a bridge B that couples the rims R, temples T located on the left and right temporal regions of a wearer when the wearer has worn the eyeglass-shaped display device according to the embodiment, and temple tips M that are hung on the left and right ears of the wearer. The eyeglass-shaped display device according to the embodiment has a nose pad NP that pinches an upper portion of the nose of the wearer to stabilize the wearing state when the wearer has worn the display device. Each of the rims R and the temples T is an example of a housing. The adjustment member 400 is provided in a portion of the bridge B coupling the rims R.

Internal Configuration

Figure 8:
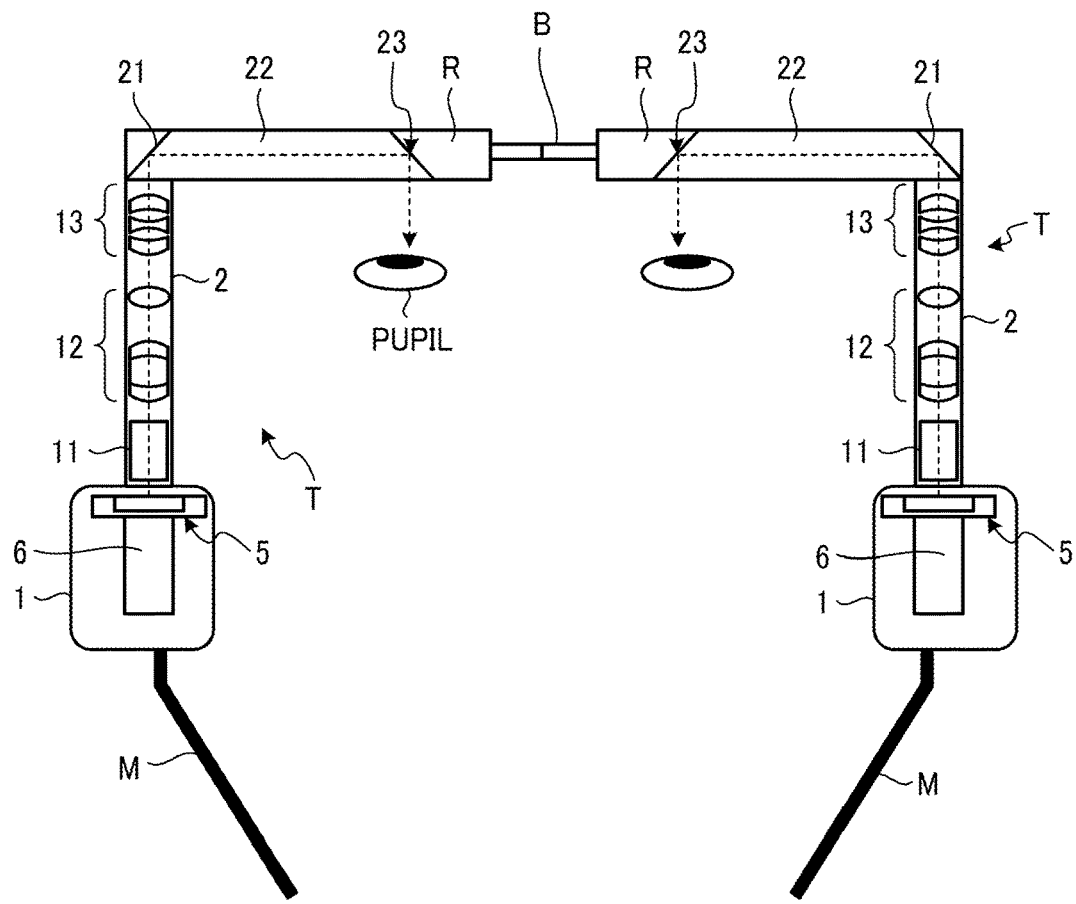
FIG. 8 illustrates an internal configuration of the eyeglass-shaped display device according to the embodiment.

FIG. 8 illustrates an internal configuration of the eyeglass-shaped display device according to the embodiment. As illustrated in FIG. 8, a light guide member 22 is a so-called light guide, and includes a first reflecting plate 21 and a second reflecting plate 23. The image light of the image displayed on the display element 5 is reflected by the first reflecting plate 21 of the light guide member 22 via the optical system, and is guided to the second reflecting plate 23. The second reflecting plate 23 reflects the image light toward the eye of the wearer. Accordingly, the image displayed on the display element 5 is visually recognized with the eye of the wearer.

Examples of the light guide member 22 include a light guide member using a half mirror, a light guide member using a hologram element, and a light guide member having a geometric structure of multistage reflection.

The housing frame 2 that defines the temple T houses the optical system configured to guide the image light of the image displayed on the display element 5 to the light guide member 22. In the case of the head-mounted display device of related art, the display element that displays the image is provided to be located in front of the eye of the wearer, or is integrally formed with the light guide member.

In contrast, the eyeglass-shaped display device according to the embodiment guides the image light from the display element 5 to the light guide member 22 via an intermediate optical system that forms an intermediate image at least once. Thus, the display element 5 and the light guide member 22 are spaced apart from each other by the length of the optical path of the optical system.

The intermediate optical system includes an image rotation optical element 11, a relay optical system 12, and an adjustable optical system 13. The image rotation optical element 1I forms image light of an image in a state where the image displayed on the display element 5 is rotated by 90 degrees.

Figure 9:
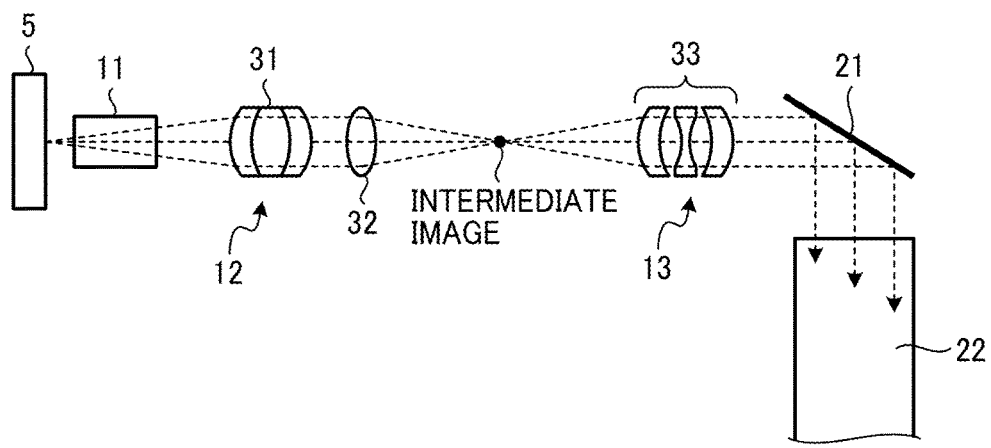
FIG. 9 illustrates a configuration of a relay optical system.

The relay optical system 12 is a so-called relay lens group, and is formed of a combination of a triplet achromatic lens 31 and a biconvex lens 32, for example, as illustrated in FIG. 9. The adjustable optical system 13 provided upstream of the first reflecting plate 21 of the light guide member 22 includes, for example, a collimator lens 33 that converts image light into parallel light, or a concave mirror. The collimator lens 33 may be formed of, for example, a glass member or a plastic member. Using the collimator lens 33 formed of a plastic member can further reduce the weight.

The relay optical system 12 and the adjustable optical system 13 are an example of an optical system. The lens groups of the relay optical system 12 and the adjustable optical system 13 include, for example, lenses having diameters of about 3 mm to 7 mm. If the diameters of the lenses are too large, the housing frame 2 is thick, and the actual field of view of the wearer may be narrowed. To efficiently use light, in one example, the lenses each have a diameter of 2 mm or more. Not to narrow the actual field of view of the wearer, in one example, the lenses each have a diameter of 8 mm or less. Thus, the lens groups of the relay optical system 12 and the adjustable optical system 13 use the lenses with diameters of 2 mm to 8 mm. This allows the housing frame 2 to be a thin and light frame close to that of general eyeglasses.

The relay optical system 12 forms an intermediate image of the image light from the display element 5 at a position located upstream of the adjustable optical system 13 as illustrated in FIG. 9. The adjustable optical system 13 causes the image light of the intermediate image to be incident on the light guide member 22 as substantially parallel light. Thus, the image light of the formed intermediate image can be incident on the light guide member 22 with the image light almost not degraded. Moreover, the size of the intermediate image and the focal length of the adjustable optical system 13 are appropriately set. Thus, image light having a large viewing angle can be incident on the light guide member 22, and the wearer can visually recognize an image having a wide field of view.

Hardware Configurations of Display Element and Peripheral Circuit

Figure 11:
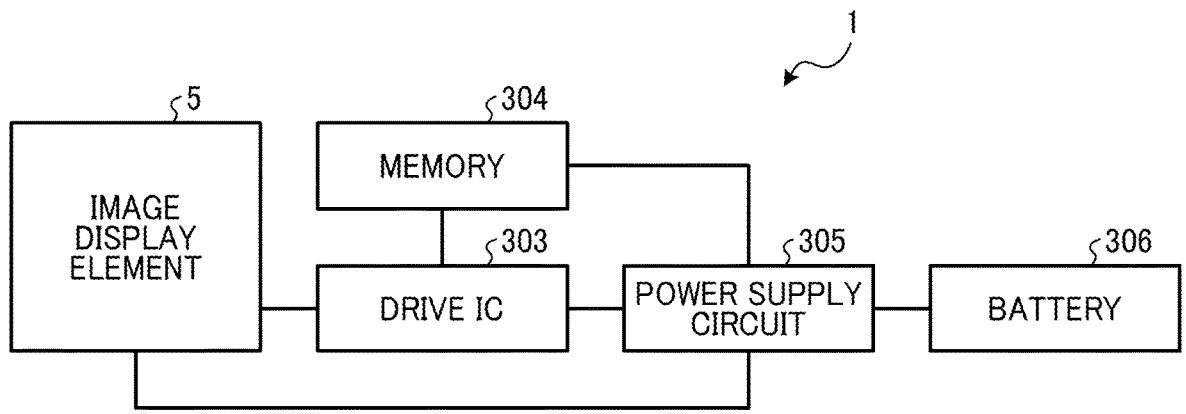
FIG. 11 is a block diagram illustrating a display element and a peripheral circuit.

FIG. 11 is a block diagram of the display element 5 and a peripheral circuit. As illustrated in FIG. 11, the display element 5, a drive circuit (drive IC) 303, a memory 304, a power supply circuit 305, and a battery 306 are housed in a display housing 1 of the eyeglass-shaped display device according to the embodiment. The drive IC 303 drives the display element 5 to display an image based on an image signal stored in the memory 304. The battery 306 is a storage battery that supplies a voltage to the power supply circuit 305.

The memory 304 stores an image signal supplied from, for example, an external device, such as a smartphone, a personal computer device, a tablet terminal device, a hard disk drive device, or a semiconductor memory device. The power supply circuit 305 converts the voltage applied from the battery 306 into a predetermined drive voltage, and supplies the converted voltage to the display element 5, the drive IC 303, and the memory 304.

Specific Example of Display Element

Figure 10A:
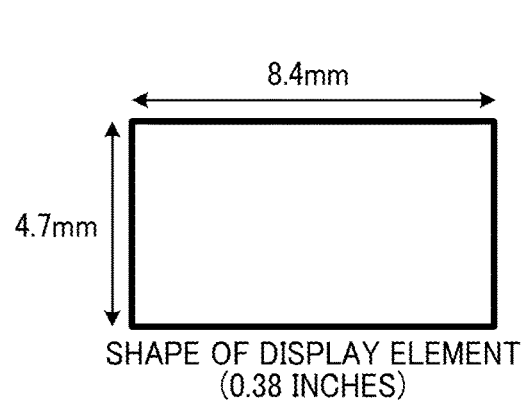
FIGS. 10A and 10B illustrate a size of a display element.
Figure 10B:
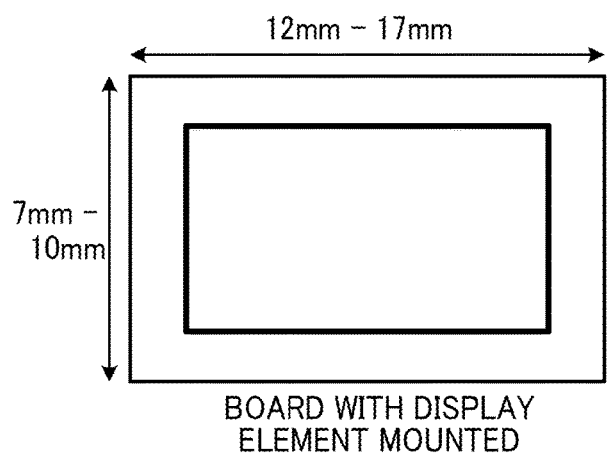

FIGS. 10A and 10B illustrate the size of the display element 5. As the display element 5, a display element that does not use reflected light can be used. For example, a transmissive liquid crystal on silicon (LCOS), an organic light emitting diode (OLED), or a reflective LCOS can be used. Alternatively, as the display element 5, for example, a transmissive liquid crystal, a reflective liquid crystal, an organic electro-luminescence (EL), a light emitting diode (LED), or a micro elector mechanical systems (MEMS) device may be used.

Note that when a transmissive LCOS, an organic EL, or an LED that does not use reflection is used as the display element 5, a light source and a member that reflects light can be omitted, and the display housing 1 can be further reduced in size and weight.

For example, as illustrated in FIG. 10A, the display element 5 has a laterally long shape having a ratio of lateral pixels by vertical pixels of 16:9, and has a high resolution such as 720 pixels or 1080 pixels. As illustrated in FIG. 10B, the display element 5 is mounted on, for example, a flexible printed circuit (FPC) 6 together with a driving element and a control element. Thus, as illustrated in FIG. 10B, the entire shape of the FPC 6 is laterally longer than the display element 5.

For example, as illustrated in FIG. 10A, in the case of the display element 5 of 0.38 inches having the ratio of lateral pixels by vertical pixels of 16:9, the display element 5 is about 4.7 mm long and about 8.4 mm wide. When the display element 5 is mounted on the FPC 6, the size of the entire FPC 6 is about 1.5 times to 2 times the size of the display element 5.

Disadvantages when Display Element is Disposed to be Laterally Long

Figure 12:
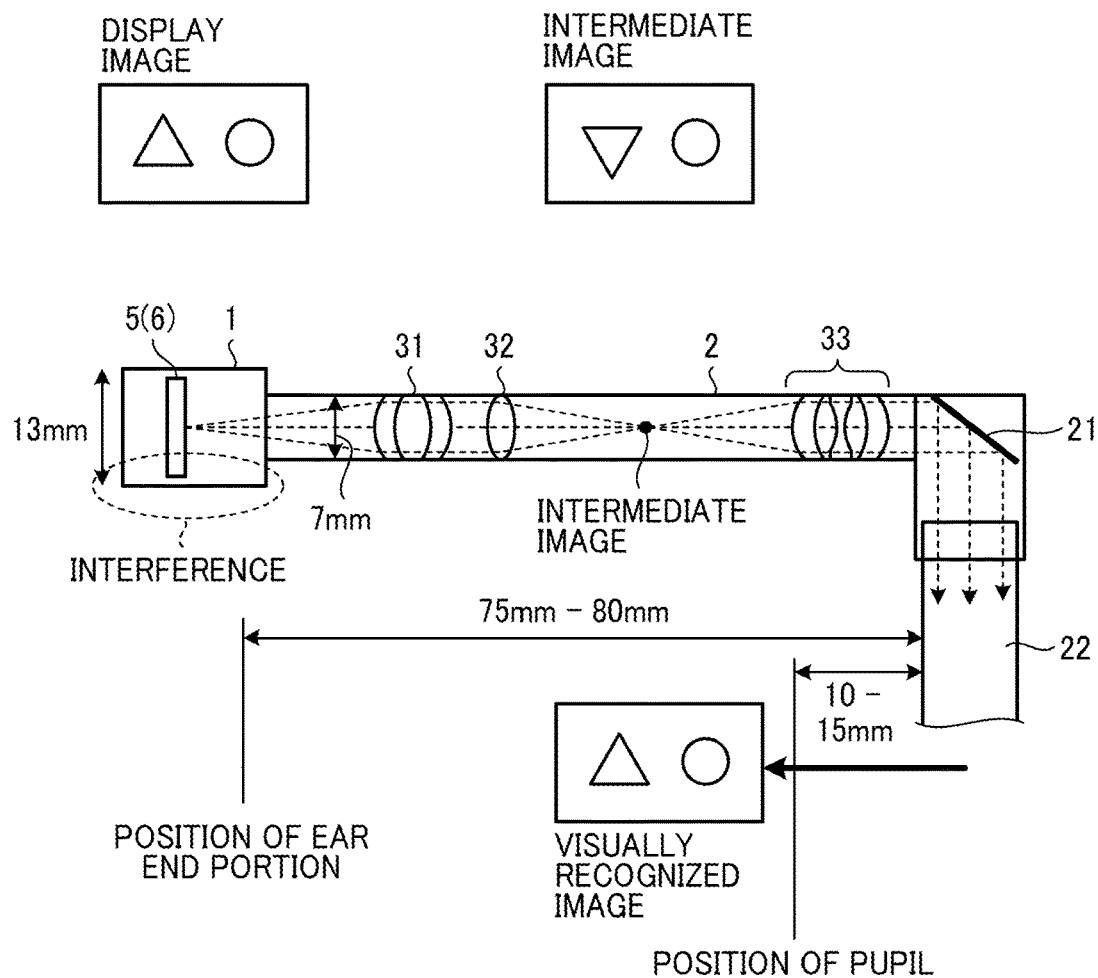
FIG. 12 illustrates an inconvenience caused when the display element is housed in a frame housing in a laterally long state.

FIG. 12 illustrates a configuration of a main portion of an eyeglass-shaped display device as a comparative example. FIG. 12 illustrates an eyeglass-shaped display device in which the display elements 5 and the FPC 6 having the sizes described with reference to FIGS. 10A and 10B are used, and the display element 5 is housed in the display housing 1 in a laterally long state. As illustrated in FIG. 12, since the display element 5 is housed in the display housing 1 in a laterally long state, the image displayed on the display element 5 is visually recognized by the wearer in a laterally long state. Thus, the image rotation optical element 11 is not required.

However, when the display element 5 is housed in the display housing 1 in a laterally long state, the shape of the display housing 1 has a shape that protrudes from the temporal region of the wearer wearing the eyeglass-shaped display device in the vertical direction (outward). For example, when the display element 5 having the lateral width of 8.4 mm is mounted on the FPC 6 as illustrated in FIG. 10A and when the lateral width of the FPC 6 is 12 mm as illustrated in FIG. 10B, the lateral width of the display housing 1 (the length in the vertical direction from the temporal region of the wearer) that houses the FPC 6 is added to the thickness of the display housing 1 and is 13 mm as illustrated in FIG. 12. The display housing 1, which is increased in size and protrudes as described above, comes into contact with and presses the ear end portion and the temporal region of the wearer. Thus, wearing the eyeglass-shaped display device for a long time may cause pain.

Figure 13:
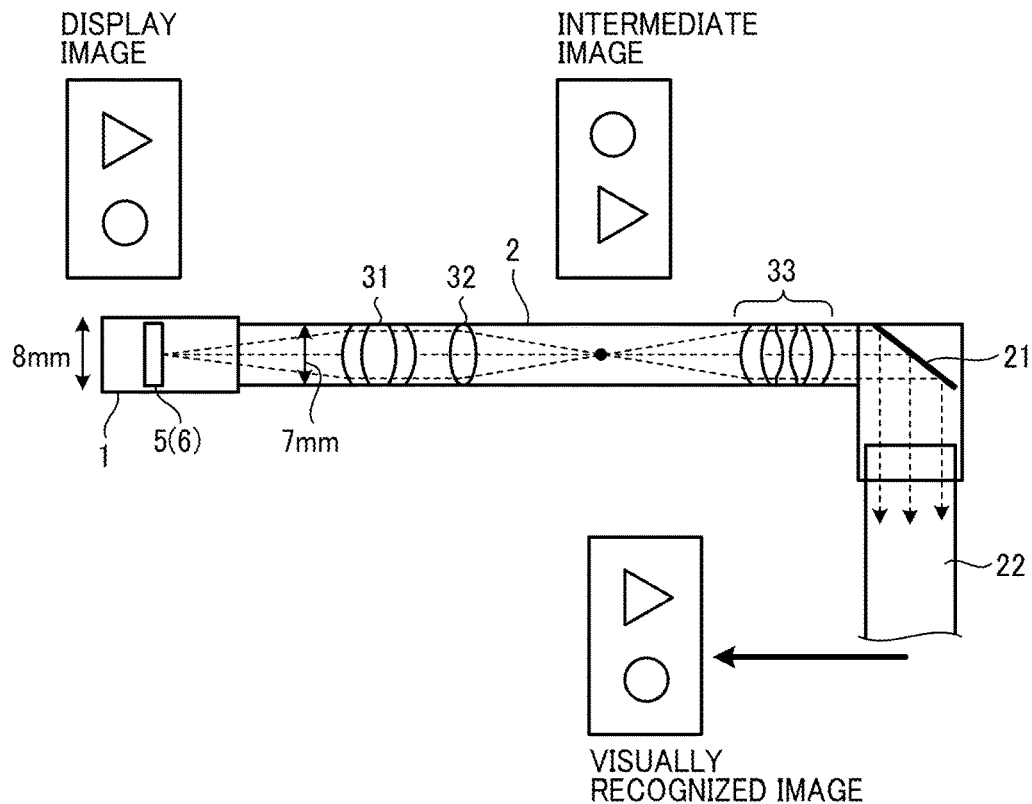
FIG. 13 illustrates an inconvenience caused when the display element is housed in the frame housing in a vertically long state and an image rotation optical element is not provided in the frame housing.
Figure 15:
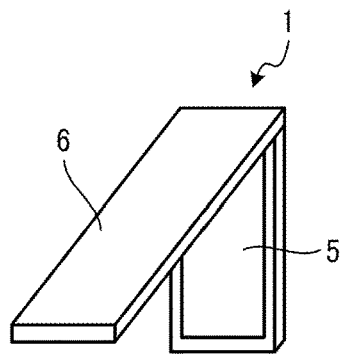
FIG. 15 is a perspective view illustrating the display element housed in the frame housing in the vertically long state and a flexible printed circuit.

It is considered that the display element 5 housed in the display housing 1 in a laterally long state is housed in a vertically long state as illustrated in FIG. 15. However, in this case, as illustrated in FIG. 13, the image displayed on the display element 5 is visually recognized by the wearer while the image is held in a vertically long state, which is not desirable.

Vertical Arrangement of Display Element

Figure 14:
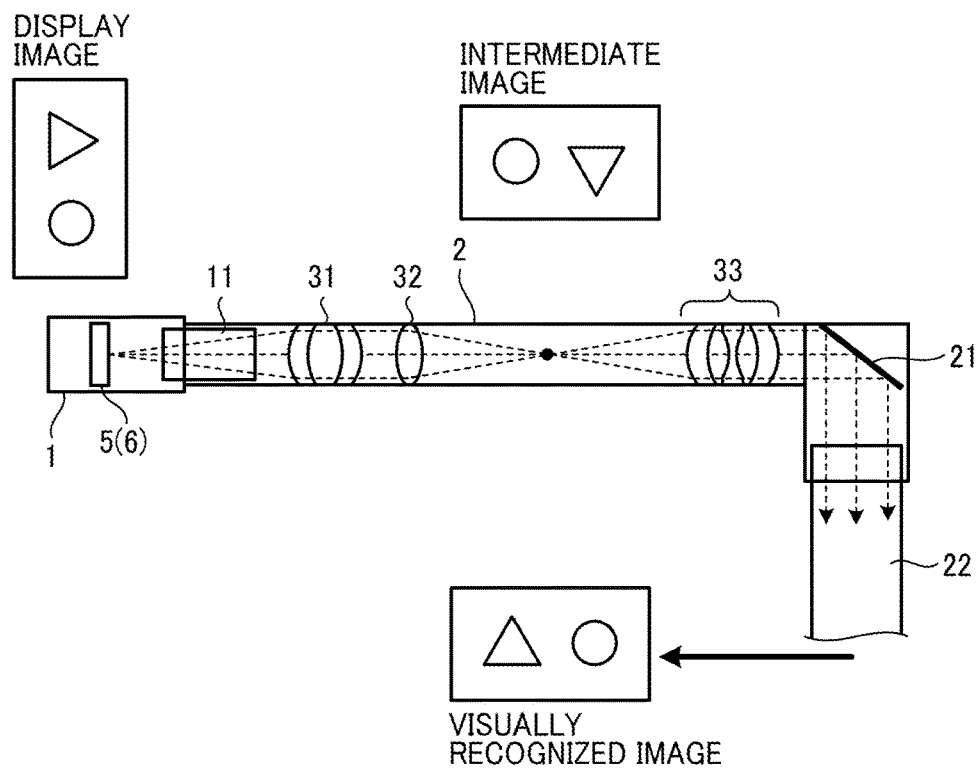
FIG. 14 illustrates that an image is normally visually recognizable when the display element is housed in the frame housing in the vertically long state and is rotated by the image rotation optical element.

As illustrated in FIG. 14, the eyeglass-shaped display device according to the embodiment includes the image rotation optical element 11 that rotates by 90 degrees the image displayed on the display element 5 housed in the display housing 1 in a vertically long state to convert the image into a laterally long image.

First Specific Example of Image Rotation Optical Element

As the image rotation optical element 11, for example, the image rotation optical element 11 illustrated in FIG. 18(a) to FIG. 18(d) can be used. The image rotation optical element 11 illustrated in FIG. 18(a) to FIG. 18(d) includes a pair of sheet-shaped prism arrays 41a and 41b formed by arranging fine prisms in an array form, and a long-plate-shaped mirror surface portion 42. The pair of sheet-shaped prism arrays 41a and 41b stand upright from end portions of the long-plate-shaped mirror surface portions 42, and are disposed so that sides with the prisms face each other. The facing sheet-shaped prism arrays 41a and 41b define an air layer. As illustrated in FIG. 18(b), the image rotation optical element 11 is secured at a position rotated by 90 degrees along the optical axis.

The sheet-shaped prism arrays 41a and 41b are fabricated by molding or cutting a plastic member. The shape of each fine prism is formed so that the upper portion has an acute angle shape at an angle of about 10 degrees to 40 degrees with respect to the mirror surface portion 42, as indicated by an angle θa in FIG. 18(d). The pitch when the prisms are arranged is, for example, about 0.1 mm to 1 mm.

As illustrated in FIG. 18(a), the image rotation optical element 11 refracts a vertically long image (incident image) displayed on the display element 5 toward the mirror surface portion 42 using the sheet-shaped prism array 41a. Thus, the vertically long image is reflected by the mirror surface portion 42 to be rotated by 90 degrees and converted into a laterally long image, and is emitted via the sheet-shaped prism array 41b (emitted image).

The image rotation optical element 11 using the sheet-shaped prism arrays 41a and 41b is very light because the space between the sheet-shaped prism arrays 41a and 41b is the air layer. This can contribute to the reduction in weight of the eyeglass-shaped display device. Optimizing the prism angle can reduce the whole length of the image rotation optical element 11 and facilitate the design for the length of the optical path. The image rotation optical element 11 using the sheet-shaped prism arrays 41a and 41b is less likely to generate chromatic aberration and image aberration. Thus, a good image can be provided for the wearer.

Second Specific Example of Image Rotation Optical Element

As the image rotation optical element 11, a Dove prism illustrated in FIG. 19(a) may be used. In this case, as illustrated in FIG. 19(b), the Dove prism is disposed in a state rotated by 90 degrees. The Dove prism may be formed of a glass member, or may be formed of a plastic member. As the plastic member, for example, polymethyl methacrylate (PMMA), polycarbonate, polystyrene, or cyclic olefin having a refractive index of about 1.4 to 1.6 can be used.

In one example, the size of the Dove prism has a square cross section in which one side has a size of about 7 mm to 10 mm. As illustrated in FIG. 19(a), the angle of the Dove prism is about 30 degrees to 50 degrees. In one example, the angle of the Dove prism is 45 degrees. Using the Dove prism formed of a plastic member can contribute to the reduction in weight of the eyeglass-shaped display device.

Third Specific Example of Image Rotation Optical Element

As the image rotation optical element 11, an image rotation optical element in which a pair of wedge prisms 61 are provided to face each other from end portions in the longitudinal direction of a long-plate-shaped mirror surface portion 62 may be used as illustrated in FIG. 20(a) to FIG. 20(c). The image rotation optical element is disposed in a state rotated by 90 degrees as illustrated in FIG. 20(b).

The wedge prisms 61 may be formed of a glass member or a plastic member. Using the wedge prisms 61 formed of a plastic member can contribute to the reduction in weight of the eyeglass-shaped display device as described above.

As the glass member or the plastic member, a glass member or a plastic member having a refractive index of about 1.49 to 1.78 can be used. As the glass member, for example, borosilicate glass or soda glass can be used. As the plastic member, for example, polymethyl methacrylate (PMMA), polycarbonate, polystyrene, or cyclic olefin can be used. In one example, a wedge angle θw illustrated in FIG. 20(c) is about 20 degrees to 40 degrees.

First Prototype Example of Eyeglass-Shaped Display Device

The applicant of the present disclosure made some prototypes of such an eyeglass-shaped display device. An eyeglass-shaped display device according to a first prototype example was formed according to the following specifications.

The light guide member 22: the light guide member 22 was formed of acrylic resin having a thickness of 10 mm, a length of 50 mm, and a height of 10 mm. The reflecting plates 21 and 23 were formed on both end portions using half mirrors at 45 degrees.

Figure 16:
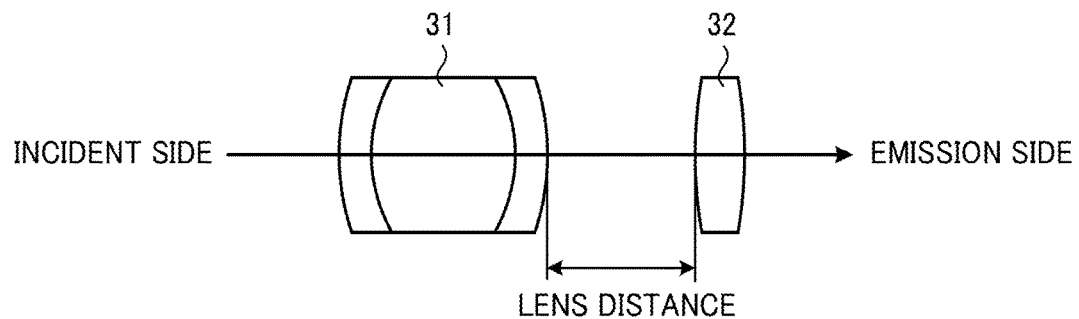
FIG. 16 illustrates an optical configuration of a relay optical system.

The relay optical system 12: as illustrated in FIG. 16, the relay optical system 12 was formed of a combination of a triplet achromatic lens 31 and a biconvex lens 32. The triplet achromatic lens 31 was formed by cutting a TS HASTINGS lens 12.5×20 MGF2, Edmond Optics, into a square of 8×8 mm in the optical-axis direction. The biconvex lens 32 was formed by cutting a TS biconvex lens 15×45, Edmond Optics, into a square of 8-8 mm in the optical-axis direction. The distance between the triplet achromatic lens 31 and the biconvex lens 32 was 7 mm.

Figure 17:
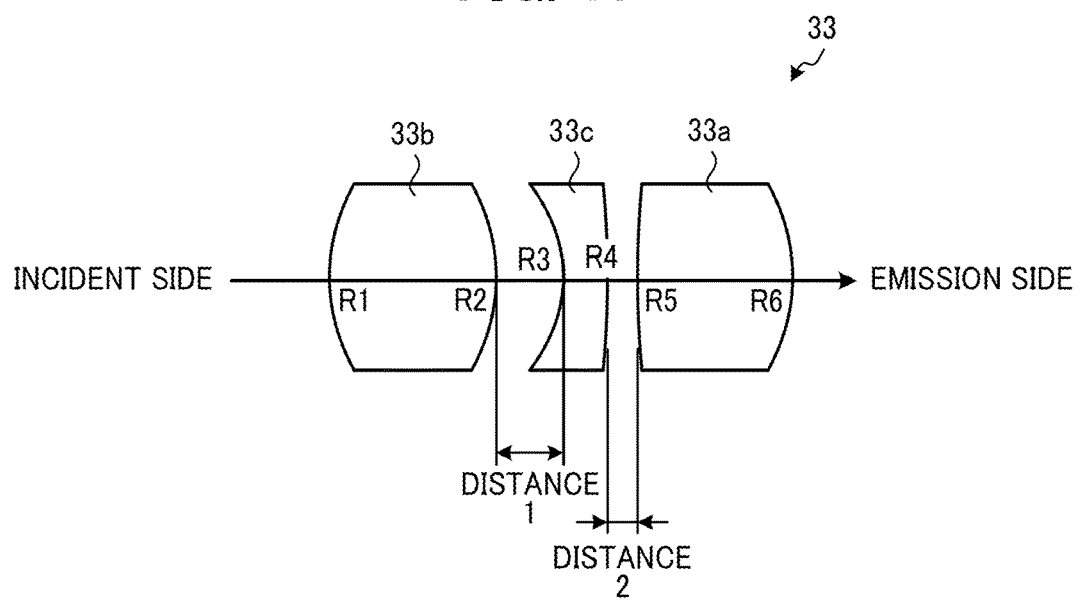
FIG. 17 illustrates an optical configuration of an adjustable optical system.

The adjustable optical system 13: as illustrated in FIG. 17, a collimator lens 33 was formed of a combination of two biconvex lenses 33a and 33b and a meniscus lens 33c. The biconvex lens 33a having a curvature radius R6 of 11 mm and a curvature radius R of −300 mm, a thickness of 7.9 mm, and nd=1.49 (PMMA) was used. The meniscus lens 33c having a curvature radius R4 of 300 mm and a curvature radius R3 of 8.5 mm, a thickness of 1.5 mm, and nd=1.49 (PMMA) was used. The biconvex lens 33b having a curvature radius R2 of −14.8 mm and a curvature radius R1 of 14.8 mm, a thickness of 8 mm, and nd=1.49 (PMMA) was used. The biconvex lens 33a, the meniscus lens 33c, and the biconvex lens 33b were arranged in this order, a distance 2 between the biconvex lens 33a and the meniscus lens 33c was 2 mm, and a distance 1 between the meniscus lens 33c and the biconvex lens 33b was 4 mm.

Figure 19:
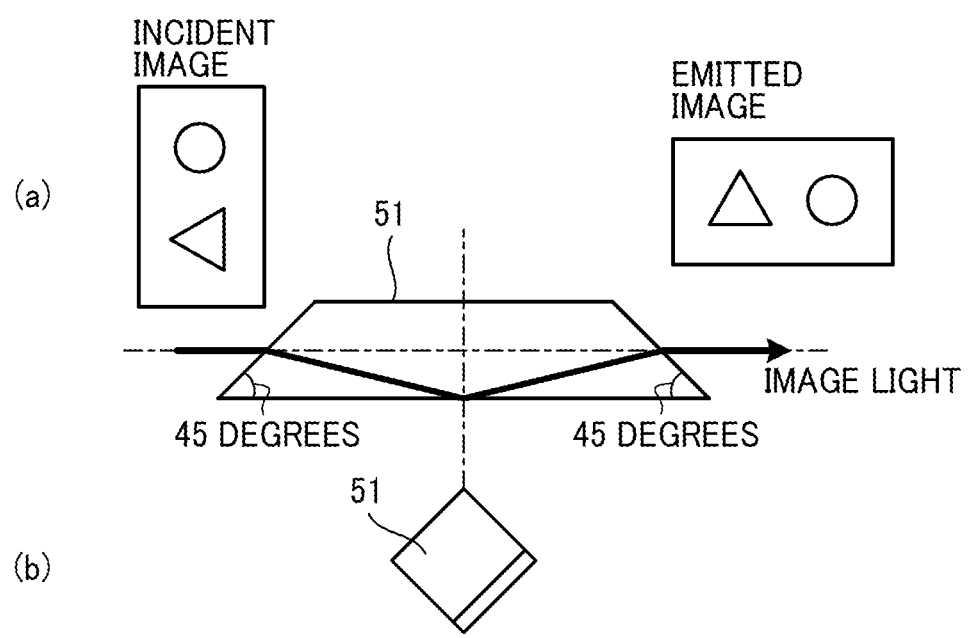
FIG. 19 illustrates an image rotation optical element including a Dove prism.

The image rotation optical element 11: a Dove prism 51 illustrated in FIG. 19 was used as the image rotation optical element 11. The Dove prism 51 having a length of 34.7 mm, a shape of square with a cross section of 8 mm, a prism angle of 45 degrees, and nd=1.49 (PMMA) was used and inclined at 45 degrees with respect to the optical axis (see FIG. 19(b)).

The display element 5: an OLED display element 720p (LIGHTNING (registered trademark) 720 AMOLED, manufactured by KOPIN Corporation) was used. The size of the display surface was 6.1 mm long by 10.85 mm wide, and the external appearance of the display element chip was 12.34 mm long and 22.44 mm wide.

The housing frame 2: the housing frame 2 had a length of about 60 mm, and a cross section of 10×10 mm.

The display housing 1: the display housing 1 was 30 mm long, 13 mm wide, and 25 mm high.

Second Prototype Example of Eyeglass-Shaped Display Device

An eyeglass-shaped display device as a second prototype example was formed according to the following specifications.

The light guide member 22, the relay optical system 12, and the adjustable optical system 13 had the same configurations as those of the above-described first prototype example.

Figure 20:
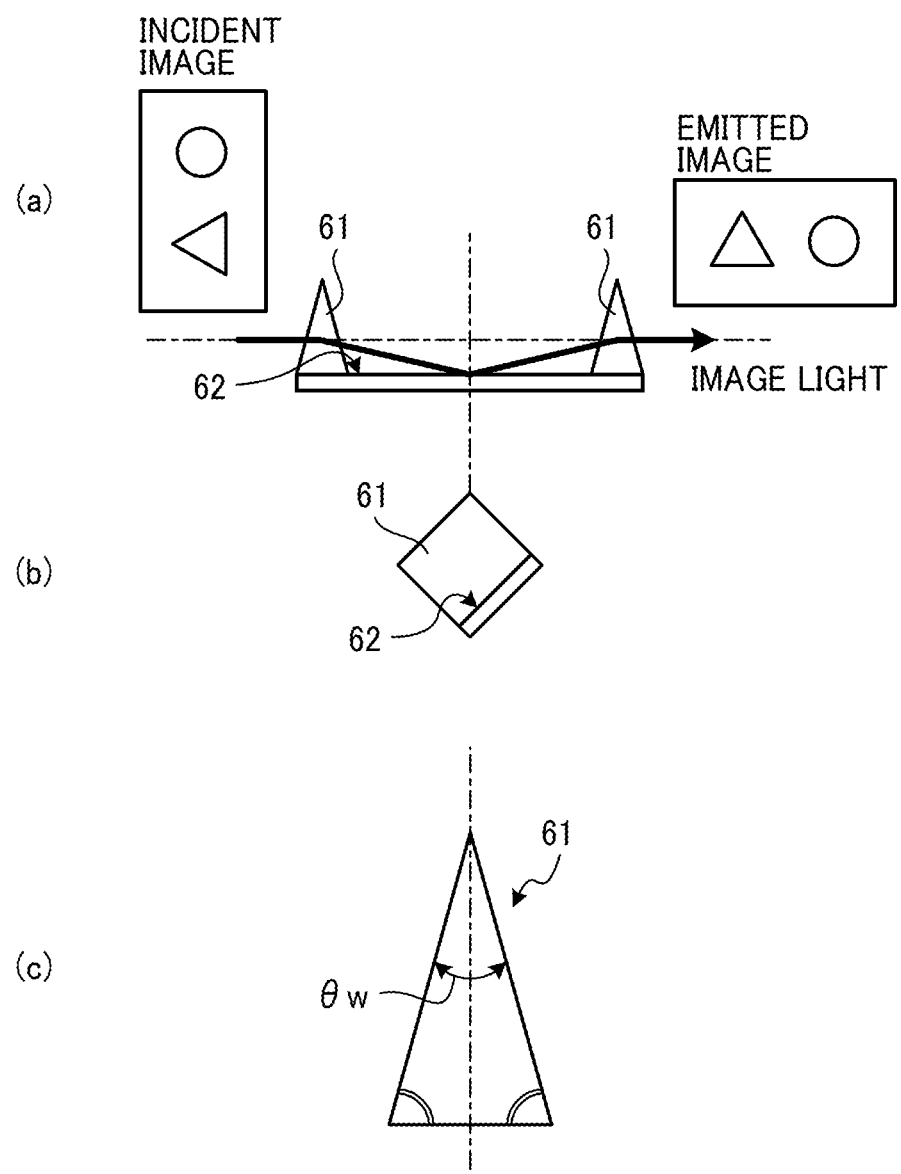
FIG. 20 illustrates an image rotation optical element including a wedge prism.

The image rotation optical element 11: as illustrated in FIG. 20, the image rotation optical element 11 including a pair of wedge prisms 61 each having a cross section of an isosceles triangle, and a mirror surface portion 62 was used. The mirror surface was inclined at 45 degrees with respect to the optical axis (see FIG. 20(b)).

The wedge prisms 61 having the following specifications were used.
glass material: N-SF14 (Schott)
wedge angle (tip acute angle θw): 30 degrees size: a height of 9 mm and a width of 8 mm mirror substrate: a mirror-finished polystyrene having a thickness of 0.5 mm with aluminum vapor-deposited distance between prisms: 23.6 mm The display element 5 the same as that of the above-described first prototype example was used.

The housing frame 2 had a length of about 60 mm and a cross section of 10×10 mm.

The display housing 1 was 25 mm long, 13 mm wide, and 25 mm high. Third Prototype Example of Eyeglass-shaped Display Device An eyeglass-shaped display device as a third prototype example was formed according to the following specifications.

The light guide member 22, the relay optical system 12, and the adjustable optical system 13 had the same configurations as those of the above-described first prototype example.

Figure 18:
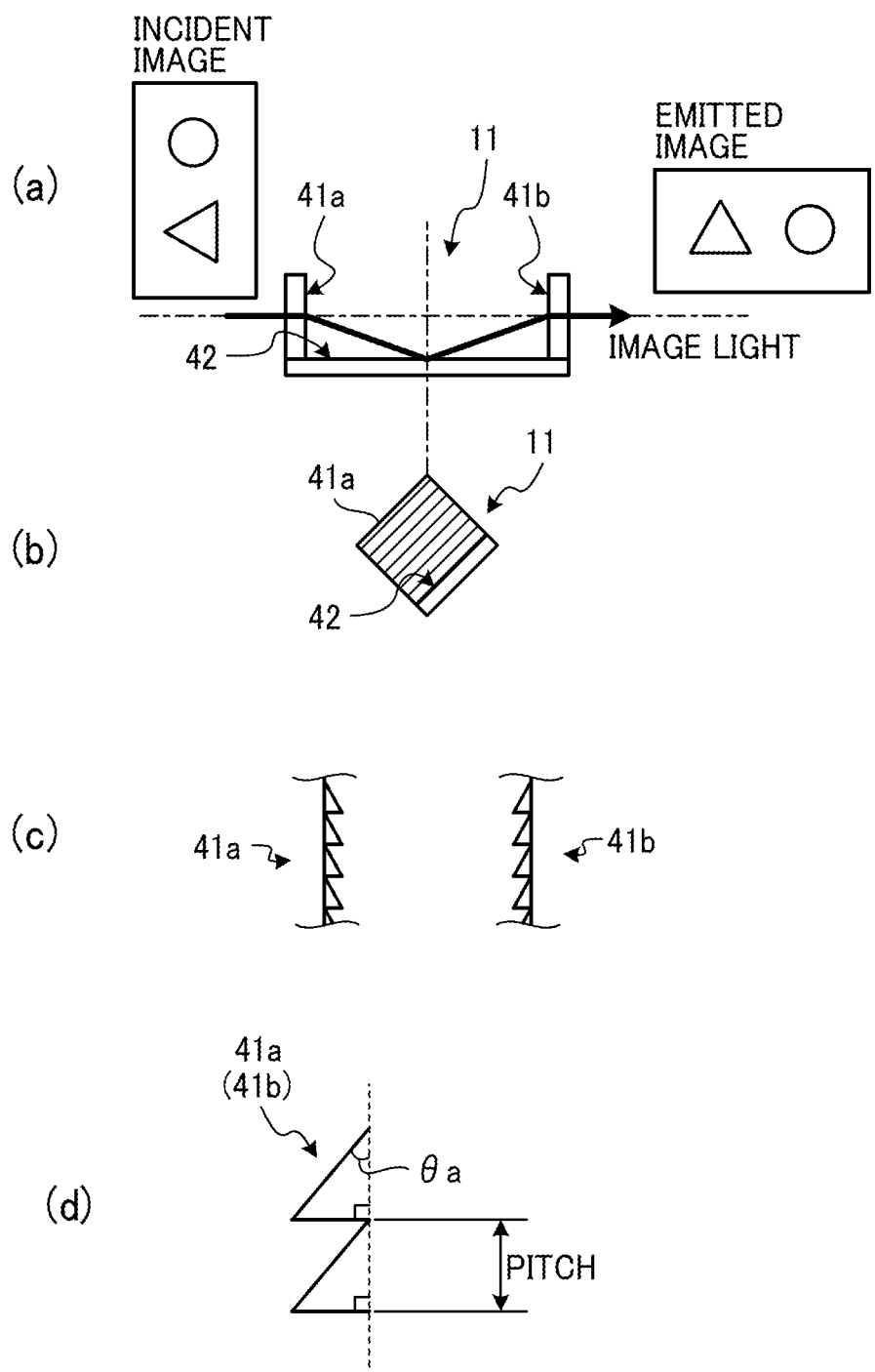
FIG. 18 illustrates an image rotation optical element including a sheet-shaped prism array.

The image rotation optical element 11: as illustrated in FIG. 18, the image rotation optical element 11 was formed by using a pair of sheet-shaped prism arrays 41a and 41b and a mirror surface portion 42, and the mirror surface portion 42 was inclined by 45 degrees with respect to the optical axis (see FIG. 18(b)).

As each the sheet-shaped prism arrays 41a and 41b, a linear prism LP40-0.3 (Nihon Tokushu Kogaku Jushi Co., Ltd.) was used. As illustrated in FIG. 18(a), the sheet-shaped prism arrays 41a and 41b were provided to stand upright from both end portions of the mirror surface portion 42, and the sheet-shaped prism arrays 41a and 41b were disposed to face each other.

The specifications of the respective sheet-shaped prism arrays 41a and 41b are as follows.

glass material: polymethyl methacrylate inclination angle θa (see FIG. 18(d)): 40 degrees prism arrangement pitch (FIG. 18(d)): 0.3 mm size of the sheet-shaped prism array: a height of 9 mm, a width of 8 mm, and a thickness of 2 mm mirror substrate: a mirror-finished polystyrene having a thickness of 0.5 mm with aluminum vapor-deposited distance between prisms: 16.2 mm The display element 5 had the configuration the same as that of the above-described first prototype example.

The housing frame 2 had a length of about 60 mm and a cross section of 10×10 mm.

The display housing 1 was 20 mm long, 13 mm wide, and 25 mm high.

Table 1 presents the length of the display housing 1 (the length of the optical element), the weight of the display housing 1 (the weight of the optical element), and the distance between the temporal region and the display housing 1 when being worn in the case where the Dove prism 51 was used as the image rotation optical element 11 (see FIG. 19), in the case where the wedge prisms 61 were used as the image rotation optical element 11 (see FIG. 20), and in the case where the sheet-shaped prism arrays 41a and 41b were used as the image rotation optical element 11.

TABLE 1

|  | Dove prism | Wedge prism | Sheet-shaped prism array |
| --- | --- | --- | --- |
| Length of optical element | 34.7 mm | 23.6 mm | 16.2 mm |
| Weight of optical element | 1.9 g | 1.25 g | 0.3 g |
| Distance between temporal region and display housing when being worn | 2 mm | 2 mm | 2 mm |

As illustrated in FIG. 12 as a comparative example, when the display element 5 is arranged to be laterally long, the size of the display housing 1 is 20 mm long, 23 mm wide, and 16 mm high, and the lateral width of the display housing 1 is 10 mm larger than that in the case where the display element 5 is arranged to be vertically long. Accordingly, the display housing 1 is closer to the temporal region by about 5 mm than the first to third prototype examples, and the eyeglass-shaped display device is not worn on the temporal region unless the temples are expanded when the wearer wears the eyeglass-shaped display device. Thus, there is an inconvenience that the temporal region of the wearer is pressed by the inner side surface of the display housing 1.

In contrast, as in the eyeglass-shaped display device according to the embodiment, when the display element 5 is arranged to be vertically long and when any of the Dove prism 51, the wedge prisms 61, and the sheet-shaped prism arrays 41a and 41b is used as the image rotation optical element 11, a gap of about 2 mm can be formed between the inner side surface of the display housing 1 and the temporal region of the wearer as presented in Table 1. It was confirmed that the inconvenience that the temporal region of the wearer is pressed can be avoided.

As described above, the sheet-shaped prism arrays 41a and 41b have a space between the sheet-shaped prism arrays 41a and 41b provided to face each other. Thus, the weight of the display housing 1 can be markedly less (0.3 g) than that in the case where the Dove prism 51 is used (1.9 g) and that in the case where the wedge prisms 61 are used (1.25 g).

Second Advantageous Effect of Embodiment

As described above, in the eyeglass-shaped display device according to the embodiment, the display element 5 is provided to be vertically long at the position of the housing frame 2 near the temporal region of the wearer when the wearer has worn the eyeglass-shaped display device. The image displayed on the display element 5 is rotated by the image rotation optical element 11 to form a laterally long intermediate image, and the wearer visually recognizes the intermediate image via the light guide member 22.

Since the display element 5 is arranged to be vertically long, the display housing 1 can be downsized, and the eyeglass-shaped display device according to the embodiment can be reduced in size and weight. Since the display housing 1 can be reduced in size, the inconvenience that the display housing 1 comes into contact with the temporal region or the like and presses the temporal region can be avoided. Since the display surface of the display element 5 is disposed at the right angle with respect to the optical axis, the length of the display housing 1 in the optical-axis direction can be reduced. Thus, the display housing 1 does not interfere with the ear, and the number of components is reduced to further reduce the size and weight of the eyeglass-shaped display device according to the embodiment.

Figure 21:
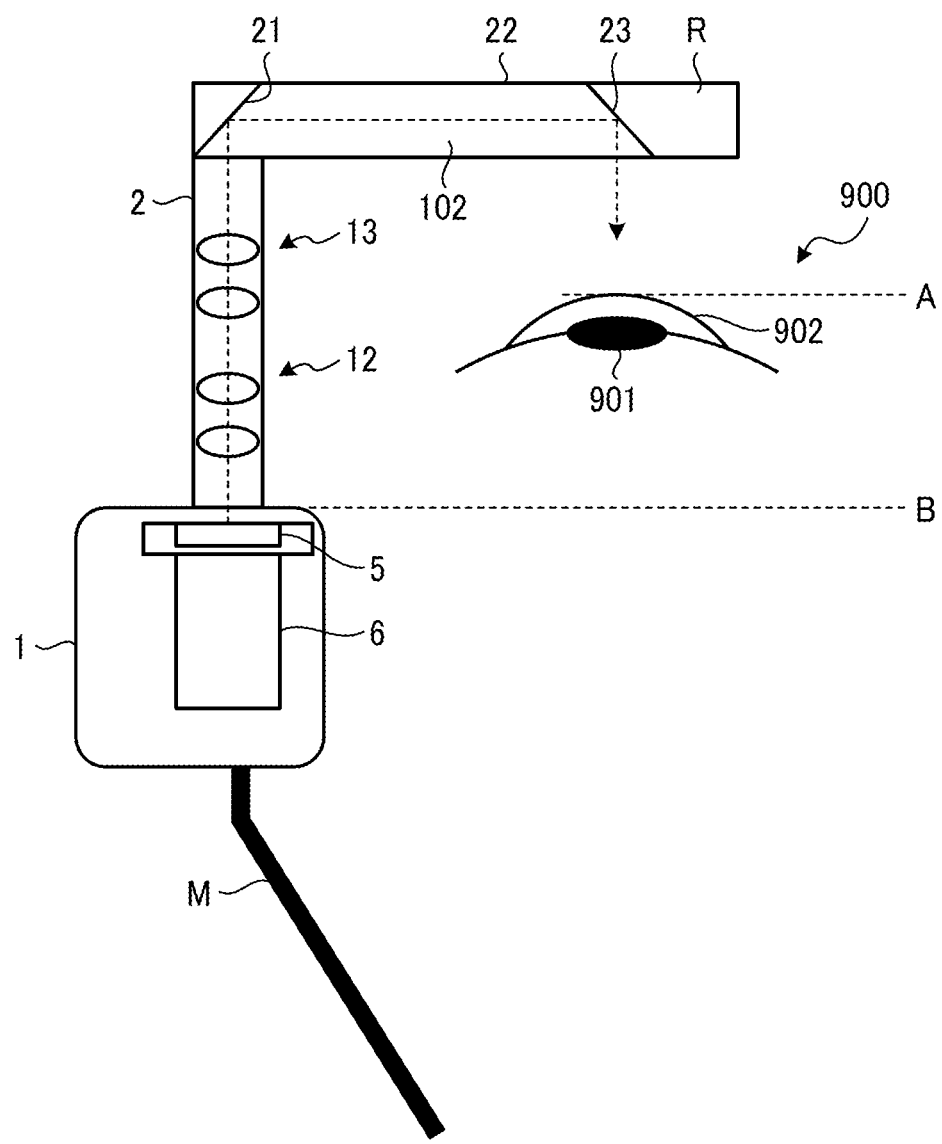
FIG. 21 illustrates a positional relationship between an eye of a wearer and an optical system that relays image light to a light guide member of a rim.
Figure 22:
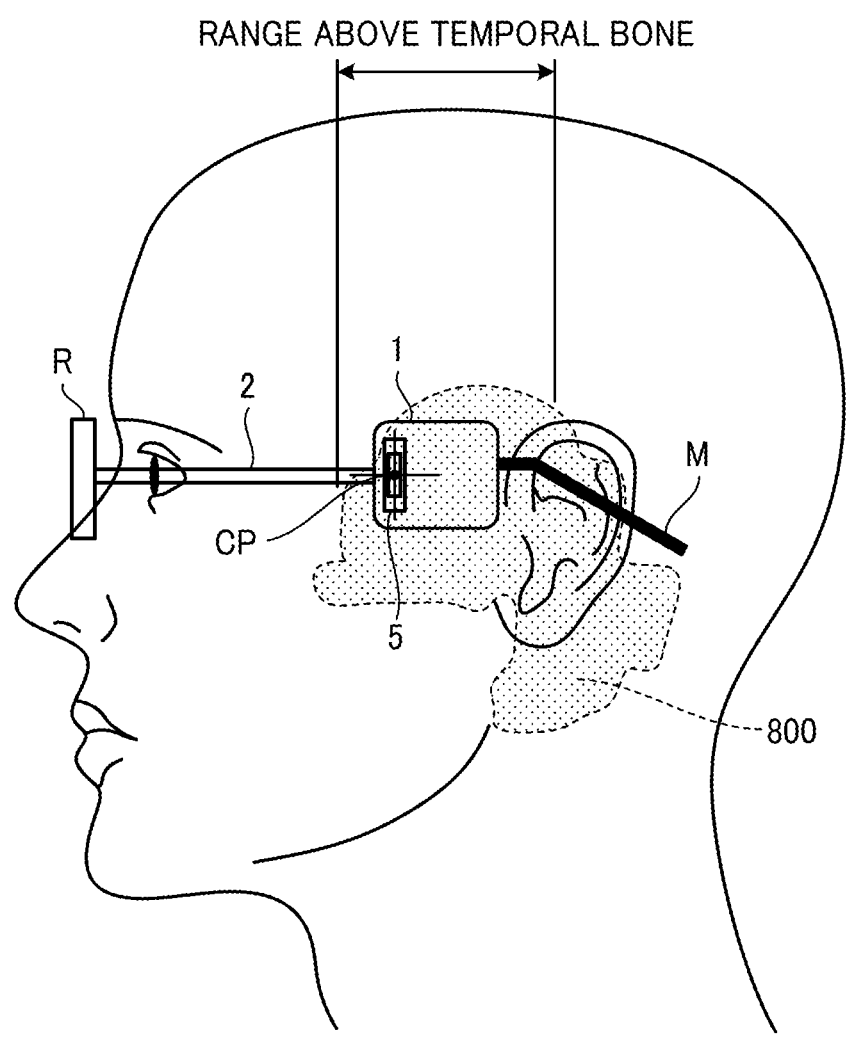
FIG. 22 illustrates a positional relationship between a display housing and a temporal bone of the wearer.

More specifically, FIG. 21 illustrates a positional relationship between the eye of the wearer and the optical system that relays the image light to the light guide member 22 of the rim R. FIG. 22 illustrates a positional relationship between the display housing 1 and the temporal bone of the wearer. When the wearer has worn the eyeglass-shaped display device according to the embodiment, as illustrated in FIG. 21, a plane B in contact with the coupling portion between the display housing 1 and the housing frame 2 is located on the rear side with respect to a plane A in contact with the vertex of a cornea 902 covering a pupil 901 of one of both eyes 900 of the wearer. The distance between the plane A and the plane B at this time is preferably 5 mm or more, and more preferably 10 mm or more.

Since the plane B is disposed on the rear side with respect to the plane A, the display housing 1 having a weight to a certain extent is disposed on the rear side, and the actual field of view of the wearer can be secured (the field of view of 180 degrees or more can be ensured). Thus, the feeling of pressure when the wearer has worn the eyeglass-shaped display device according to the embodiment can be reduced.

As illustrated in FIG. 22, since the light guide member 22 and the display housing 1 are provided to be spaced apart from each other with the housing frame 2 interposed therebetween, the center CP of the display housing 1 is located near a temporal bone 800 of the wearer. Thus, the display housing 1 to which the display element 5 is secured comes into contact with the vicinity of the temporal region of the wearer, the load of the eyeglass-shaped display device is dispersed, and thus the load on the nose can be reduced.

Note that the greater the distance between the plane A and the plane B (=the distance between the light guide member 22 and the display housing 1) is, the more the actual field of view can be ensured, and hence the effect of reducing the feeling of pressure when the wearer has worn the eyeglass-shaped display apparatus is enhanced.

In this case, an intermediate image is not formed. Hence, the focal length of the relay optical system 12 can be reduced, the housing frame 2 can be downsized, and a wide field of view when being worn can be ensured. However, in this case, it is difficult to ensure the gap portion to which the image rotation optical element 11 is inserted between the display element 5 and the relay optical system 12. When the image rotation optical element 11 is not able to be inserted, it is difficult to convert the display image on the display element 5, which is disposed to be vertically long, into a laterally long image as illustrated in FIG. 13.

In the eyeglass-shaped display device according to the embodiment, the arrangement of the relay optical system 12 and the adjustable optical system 13 is adjusted to form an intermediate image. Thus, the gap portion to which the image rotation optical element 11 is inserted can be ensured between the display element 5 and the relay optical system 12. Inserting the image rotation optical element 11 into the gap portion can maintain the vertical arrangement of the display element 5. Thus, the housing frame 2 can be downsized, and a wide field of view when being worn can be ensured.

There is also known a head-mounted display device of a type in which a display is in front of an eye and the wearer visually recognizes an image directly or indirectly via a lens. The head-mounted display device of this type or a first type is known as, for example, a head-mounted display that provides binocular non-transmissive VR displaying, or a small monocular head-mounted display.

A head-mounted display device of this first type includes two left and right sets each including an image display device, a drive circuit, and an optical system in front of the eyes, and the total weight of the head-mounted display device may be 500 g or more in many cases. It is very painful to continuously wear such a heavy and large head-mounted display device for a long time.

In contrast, the eyeglass-shaped display device according to the embodiment can be reduced in size and weight as described above, and thus can be worn for a long time without causing pain to the wearer.

There is further known a head-mounted display device of a type that projects image light of an image displayed on an image display element and that reflects the image light using a semi-transmissive element, such as a mirror or a half mirror, in front of an eye to allow the wearer to visually recognize the image light. In the head-mounted display device of this type or a second type, the image display element and the semi-transmissive element, such as a mirror or a half mirror, may be spaced apart from each other. Thus, the image display element can be disposed on the rear side with respect to the eyeball surface to reduce the weight of the portion on the front side with respect to the eyeball surface and reduce the burden on the nose of the wearer.

However, the head-mounted display device of this second type has disadvantages that it is difficult to display an image on a large screen because image light is projected from the lateral side of the face onto the semi-transmissive element, such as a mirror or a half mirror, and an image is displayed on a screen having a small viewing angle.

In contrast, in the eyeglass-shaped display device according to the embodiment, the arrangement of the relay optical system 12 and the adjustable optical system 13 is adjusted to form an intermediate image, Thus, the gap portion to which the image rotation optical element 11 is inserted can be ensured between the display element 5 and the relay optical system 12. Inserting the image rotation optical element 11 into the gap portion can maintain the vertical arrangement of the display element 5. Thus, the housing frame 2 can be reduced in size and weight, and a wide field of view when being worn can be ensured.

There is also known a head-mounted display device of a type in which the wearer visually recognizes image light of an image displayed on an image display element via a light guide member. The head-mounted display of this type or a third type is, for example, a head-mounted display device that provides binocular transmissive AR displaying. The head-mounted display device of this third type guides image light of an image displayed on an image display element to a light guide member using a collimator lens or a mirror, and allows the wearer to visually recognize the image light via the light guide member. As described above, since the image light is visually recognized via the light guide member, image displaying with a viewing angle of 20 degrees or more can be provided, and large image displaying with a viewing angle of about 60 degrees can be also provided depending on the structure of the light guide member.

However, the head-mounted display device of this third type also has a structure in which the image display element, the collimator lens, the mirror, and the light guide member are integrated, and the center of gravity of the structure is designed on the front side with respect to the eyeball surface. Thus, there is a disadvantage that the burden of the lord on the nose of the wearer is large, and it is difficult to wear the eyeglass-shaped display device for a long time.

In contrast, in the eyeglass-shaped display device according to the embodiment, the center of gravity is on the display housing 1 side, and thus the burden on the nose when being worn can be reduced. Further, even when the center of gravity is on the display housing 1 side, the display housing 1 is reduced in size and weight, and thus the burden on the ear can be reduced. Thus, comfortable wearing can be provided for a long time without pain to the wearer.

In the case of the head-mounted display device of the third type, the above-described structure closes the left and right peripheral fields of view of the wearer. The general field of view of a human is 180 degrees or more, but the head-mounted display device of the third type has a risk that the field of view when being worn is narrowed to 100 degrees or less.

In contrast, in the eyeglass-shaped display device according to the embodiment, since the display housing 1 can be downsized, an inconvenience that the display housing 1 and the housing frame 2 interfere with the field of view of the wearer can be avoided.

The above-described embodiments have been provided as examples, and are not intended to limit the scope of the present disclosure. The new embodiments may be implemented in a variety of other forms; furthermore, various omissions, substitutions, and changes in the forms may be made without departing from the gist and scope of the disclosure.

For example, in the description of the above-described embodiments, the adjustment member 400 is provided in the bridge B; however, the adjustment member 400 may be provided in each end piece (a coupling portion between the housing frame 2 and the rim R (the light guide member 22)). Alternatively, the adjustment member 400 may be provided in the bridge B, and may be also provided in each end piece. In this case, the adjustment member 400 is provided near the temporal region of the wearer. The adjustment member 400 provided in each end piece causes the light guide member 22 and the housing frame 2 to bend on the side opposite to the face of the wearer about the end piece. Thus, advantageous effects similar to those described above can be obtained.

Further, the embodiments and the modifications according to the embodiments are included in the scope and gist of the disclosure, and are included in the disclosure described in the claims and the equivalents thereof.

The invention claimed is:

1. A head-mounted display device comprising:
a display located within each of temples at left and right temporal regions of a wearer respectively to display an image;
a light guider located within each of rims respectively to emit the image displayed on the display to an eye of the wearer, the light guider including a first reflecting plate and a second reflecting plate, the first reflecting plate located at one end of each of the rims to guide an image light in a direction toward a bridge between the rims and the second reflecting plate located at the other end of each of the rims to reflect the image light toward the eye of the wearer;
a relay optical structure disposed between the display and the light guider to guide the image light from the display to the light guider;
an adjustable optical structure disposed between the relay optical structure and the light guider to convert the image light to a parallel light, the adjustable optical structure including a collimator lens;
wherein an intermediate image is formed based on the image light from the relay optical structure, and is incident on the collimator lens;
a housing including an optical system, the optical system located within each of the temples at the left and right temporal regions of the wearer respectively to guide the image light of the image displayed on the display to the light guider, the optical system including an image rotation optical structure, the relay optical structure, and the adjustable optical structure; and
an adjuster provided in the bridge on a side of the light guider opposite to the optical system to bend the housing on a side opposite to a face of the wearer, wherein the adjuster comprises a torsion spring or a rubber member, and a length of an optical path between the display and the second reflecting plate remains constant when the adjuster is deformed.

2. The head-mounted display device according to claim 1, wherein the adjuster is formed of an elastic member.

3. The head-mounted display device according to claim 1, wherein the adjuster has a bending stress smaller than a bending stress of the housing.

4. The head-mounted display device according to claim 1, wherein the adjuster is provided near a temporal region of the wearer when the wearer has worn the head-mounted display device.

5. The head-mounted display device according to claim 1, wherein the head-mounted display device has a shape of eyeglasses including the rims, and the adjuster is provided in a bridge coupling the rims.

6. The head-mounted display device according to claim 1, wherein the display is disposed in a vertically long state and displays an image of which a laterally long state is a normally visually recognized state, and
the optical system includes the image rotation optical structure to rotate a vertically long image displayed on the display to form a laterally long image, and to form an intermediate image of the rotated laterally long image at least once to guide the generated intermediate image to the light guider.

7. The head-mounted display device according to claim 6, wherein the image rotation optical structure includes a pair of wedge prisms and a mirror member.

8. The head-mounted display device according to claim 6, wherein the image rotation optical structure includes a pair of sheet-shaped prism arrays and a mirror member.

9. The head-mounted display device according to claim 6, wherein the image rotation optical structure includes a Dove prism.

10. The head-mounted display device according to claim 1, wherein the adjuster has a rectangular shape with two holes near short sides of the rectangular shape.

11. The head-mounted display device according to claim 10, wherein the adjuster is inserted into attachment groove portions of the housing and screwed to the housing through the two holes.

12. The head-mounted display device according to claim 1, wherein the adjuster is attached to the housing through an adhesive.

13. The head-mounted display device according to claim 1, wherein the display and the light guider are spaced apart from each other by a length of an optical path of the optical system.

14. The head-mounted display device according to claim 1, wherein the relay optical structure forms an intermediate image of the image light from the display at a focus point of the adjustable optical structure, and the adjustable optical structure causes image light of the intermediate image to be incident on the light guider as substantially parallel light.

15. The head-mounted display device according to claim 1, wherein positional relationship between the optical system in the housing and the light guider remains constant when the adjuster is deformed.

16. The head-mounted display device according to claim 1, wherein lens of the relay optical structure and the adjustable optical structure has diameters in a range of 2 mm to 8 mm.

17. The head-mounted display device according to claim 1, wherein a plane B in contact with a coupling portion between a display housing including the display and the housing including the optical system is located on a rear side with respect to a plane A in contact with vertex of a cornea covering a pupil of one of both eyes of the wearer.

18. The head-mounted display device according to claim 17, wherein a vertical distance between the plane A and the plane B is 10 mm or more.

19. The head-mounted display device according to claim 17, wherein a center CP of the display housing is located near a temporal bone of the wearer.

20. The head-mounted display device according to claim 1, wherein the relay optical structure includes a triplet achromatic lens and a biconvex lens.

\* \* \* \* \*